No. 623,383. Patented Apr. 18, 1899.
F. A. POCOCK.
MOTOR VEHICLE.
(Application filed Apr. 13, 1898.)
(No Model.) 3 Sheets—Sheet 2.
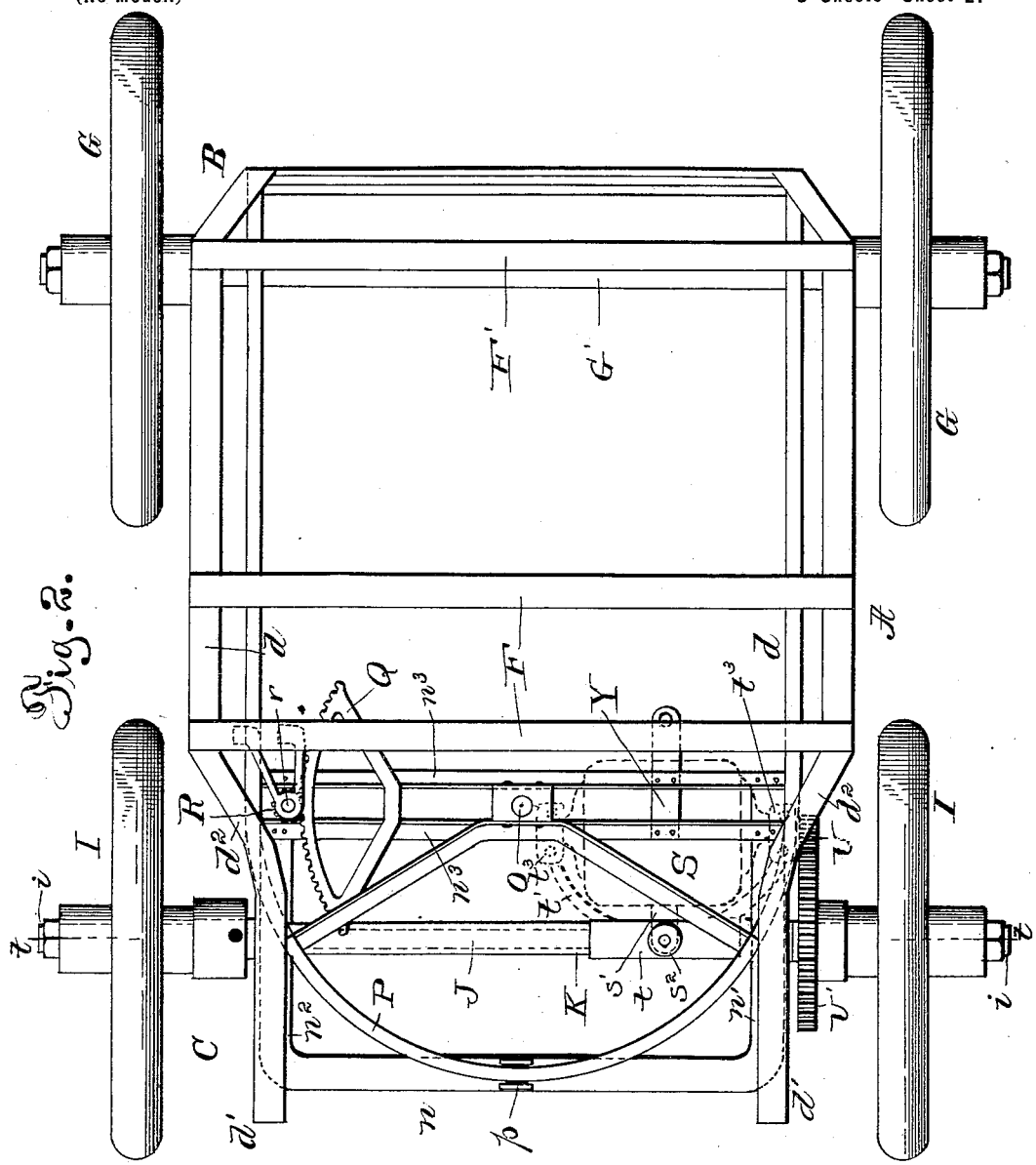

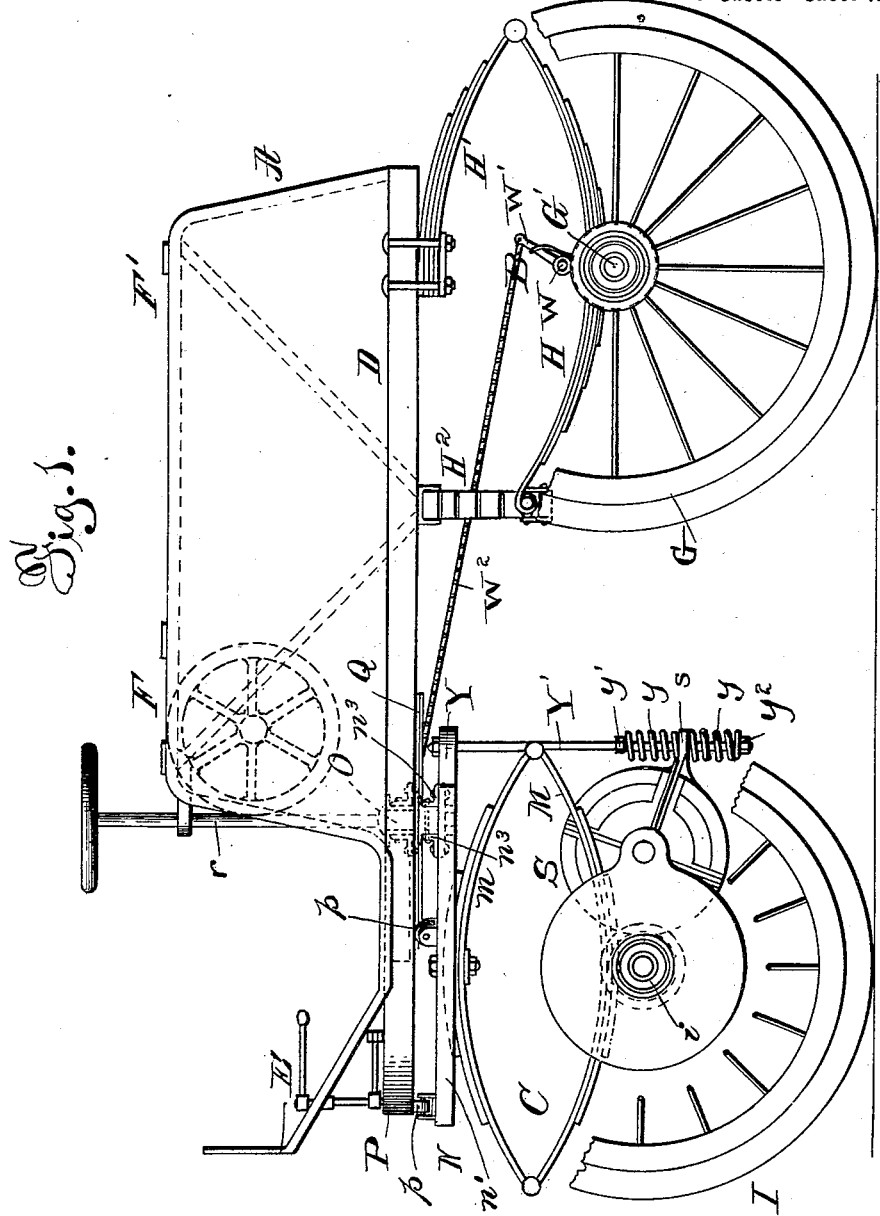

No. 623,383. Patented Apr. 18, 1899.
F. A. POCOCK.
MOTOR VEHICLE.
(Application filed Apr. 13, 1898.)
(No Model.) 3 Sheets—Sheet 3.

Witnesses
Arthur L. Bryant
George Buckler

Inventor
Francis A. Pocock
by H. H. Bliss
Atty.

UNITED STATES PATENT OFFICE.

FRANCIS A. POCOCK, OF PHILADELPHIA, PENNSYLVANIA, ASSIGNOR, BY MESNE ASSIGNMENTS, TO THE ELECTRIC POWER DEVELOPMENT COMPANY.

MOTOR-VEHICLE.

SPECIFICATION forming part of Letters Patent No. 623,383, dated April 18, 1899.

Application filed April 13, 1898. Serial No. 677,473. (No model.)

*To all whom it may concern:*

Be it known that I, FRANCIS A. POCOCK, a citizen of the United States, residing at Philadelphia, in the county of Philadelphia and State of Pennsylvania, have invented certain new and useful Improvements in Motor-Vehicles; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 6:
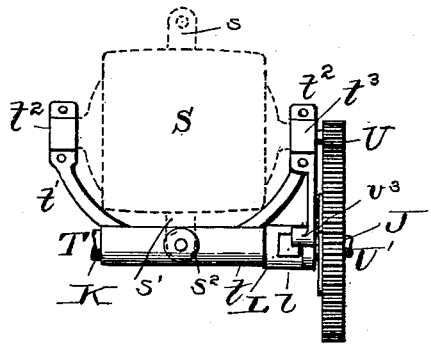
Figure 7:
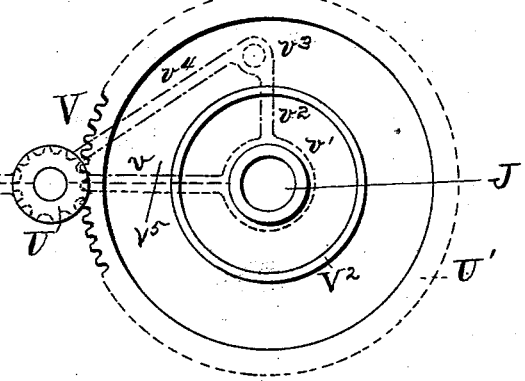
Figure 4:
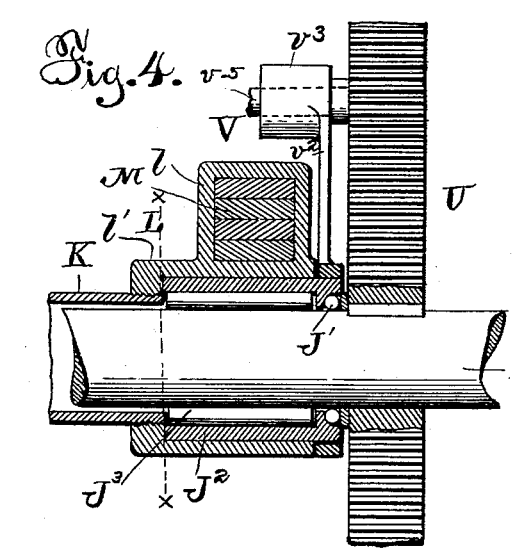
Figure 5:
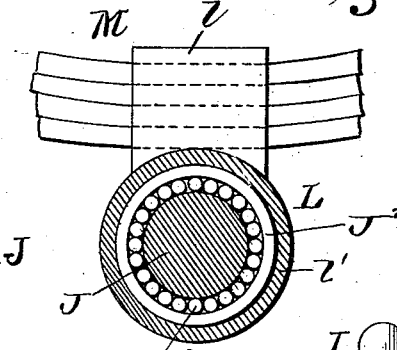
Figure 3:
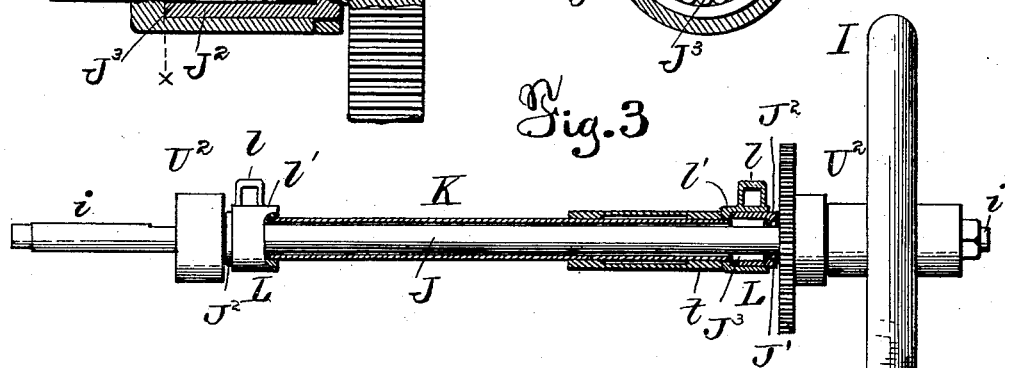

Figure 1 is a side elevation of a vehicle embodying my improvements. Fig. 2 is a top plan view of the framework. Fig. 3 is a longitudinal section of the front axle. Fig. 4 is a section of a part of the same on a larger scale. Fig. 5 is a section across the axle on the line $x\,x$ of Fig. 4. Fig. 6 is a plan view of the motor, its support, and the gearing detached. Fig. 7 is a face view of the gearing and the brake device.

In the drawings I have for the purpose of illustration selected a vehicle whose general features are somewhat similar to those of a class known.

A represents the body as a whole, B the rear running-gear, and C the front running-gear.

The body A comprises a framework D at the bottom and parts rising upwardly therefrom, the latter having a foot-board at E and seat-supports at F F'. The seat-supporting portion has suitable upward-extending frame-pieces and walls arranged to inclose a chamber, wherein are carried and concealed the several parts of a battery, the frame of the body having side bars, with the parts $d$ relatively farther apart and the front parts $d$ relatively nearer together, with the converging connecting parts $d^2$.

The rear running-gear comprises the wheels G, mounted upon the axle G', the latter being connected to the body A by springs. As shown, the spring system for the rear running-gear consists of the semielliptic spring H, secured to the axle G', the quarter of an elliptic spring H', secured to the body A and hinged to the bottom spring H, and the cross elliptic spring $H^2$, hinged to the springs H and secured rigidly transversely to the under side of the body. There are one of the springs H and one, as at H', on each side of the body. This spring system at the rear of the vehicle is rigid with the body, the rear running-gear in this vehicle not being depended upon for the steering of the vehicle and not requiring movement relatively thereto.

The front running-gear C is peculiarly constructed and connected to the other parts as follows: I I indicate the front wheels. They are mounted upon spindles $i\,i$ on the ends of the axle-bar J. This axle is rotary and is mounted in a stationary tubular support K. This tube or support K is at the ends rigidly secured to brackets L. The brackets L are connected, respectively, to the elliptical springs M, each of which springs has an upper half for connecting it to the carriage-frame and a lower half which is rigidly secured to the sockets $l$ of the brackets L. The upper halves $m$ of the springs M are rigidly connected to a rotatable frame N. Preferably this frame is made substantially as shown, with a cross-bar $n$ and two rearward-extending end portions $n'\,n^2$. The forward part of the body-frame D rests upon this frame N, and therefore upon the front running-gear— that is, the front springs M, the tube K, the axle J, and the wheels I.

Heretofore it has been common in motor-driven vehicles having the front running-gear arranged to be used for steering to pivotally connect the front gear with the body in such way that one could rotate as to the other around a vertical axis passing through the front axle. I have found that several important ends can be attained if a radically different connection be provided between the front gear and the vehicle-body. One of the important features of this novel connection which I have devised consists in having the vertical axis about which the front gear turns situated at a line considerably in the rear of the front axle. To embody this principle, I utilize the frame N and extend the side bars $n'\,n^2$ thereof to points considerably in rear of the front axle. At their rear ends (normally lying under the body) I connect them by one or more cross-bars $n^3$, adapted to hold the pivot-bar O. This pivot connects together the rotary frame N and the body-frame. By examining Fig. 2 and by comparing the position of this vertical pivot O with the line $t\,t$ of the front axle it will be seen that the latter is considerably in advance of the pivot—that is to say, the vertical axis of steering is at a line between the axes of the front wheels and the rear wheels. As a result the vehicle tends to bring the rear wheels into proper alinement relative to the front wheels—an end which cannot be reached when the steering-axis is in the plane of the front-wheel axis, particularly when the propelling power is applied to the front axle, as in this machine. A sort of fifth-wheel device is interposed between the body-frame and the frame of the front running-gear, there being a long curved guide-bar P secured to the under side of the body-frame, to which are fitted and along which run a series of antifriction-rollers $p\,p$, mounted on the frame-bars $n\,n'\,n^2$. The curved bar P is concentric with the pivot at O. The steering is effected by means of a segment-bar Q, which is rigidly fastened to the front-gear frame, it having a series of teeth and also being concentric with the said pivot O. With this toothed segment there engages a pinion R, carried by a vertical shaft $r$, which is mounted in one or more suitable bearings on a body-frame and having a handle or wheel within reach of the driver.

The arrangement which I have above described of the parts which provide a pivotal connection between the front gear and the body and by means of which the steering is effected insures much greater facility in steering and a more complete control of its movements. When the pivot O is behind the front axle, as described, but little power is required to turn the segment Q and the front gear.

The motor is indicated as a whole by S. It is supported in a novel and peculiar manner.

Heretofore electrically-propelled cars and other vehicles have had the motors hinged directly to the axles. In electric cars this has been necessary because of the fact that the axle-boxes were on the outside of the wheels and there were no means between the wheels other than the axle upon which to support the motor. At the same time it has been recognized by electrical engineers that this manner of supporting the motor was very disadvantageous, inasmuch as it threw a large amount of weight upon the axle, with the results which are not only obvious, but which have been fully established in practical experience.

One of the objects of the present invention is to support the motor otherwise than by hinging it to the axle, and this is accomplished as follows: As above described, the boxes or brackets L for the axle J are situated inside of the wheels I. They are connected and held to the body-frame through the above-described intermediate frame D, the pivot O, and the springs M. The boxes or brackets L are connected together and spaced and braced by means independent of the axle J, such means in the construction shown being a tube or sleeve loosely surrounding the axle and rigidly secured to the boxes or brackets, said sleeve being preferably entirely out of contact with the shaft. Each box L has an inward-projecting hub or boss $l'$, provided with a screw-threaded socket, and the ends of the tube K are threaded to engage therewith. Upon this support, independent of the axle, there is secured the motor-carrier, (indicated as a whole by T.) This has a tubular supporting part $t$, which is connected to the tube K, above described. From the tubular part $t$ there project backward arms $t'$, in the rear ends of which there are formed boxes $t^2$, adapted to receive caps $t^3$. The motor S is partially suspended in the arms $t'$, it also having a spring support or connection with the body at points behind the arms.

The motor consists of a relatively stationary field and a rotary armature, which may be of any ordinary sort. The armature-shaft carries a pinion U, which connects with a spur-wheel U'. The latter is keyed to the axle J. The front wheels I I are loosely mounted on the spindles $i\,i$, but are adapted to be automatically connected thereto by clutches at $U^2\,U^2$. These clutches are of any preferred sort adapted to permit one wheel to rotate faster than the other. Ordinary "backing ratchets" can be used, and by them can be obtained many of the advantages at which I aim. When the carriage is moving forward under normal conditions, with the load uniformly distributed upon both of the front wheels, the motor, its gearing, and the axle impart similar motion and speed to both of them. When turning upon a curve, the one can be driven to a greater or less extent than the other and independently thereof. The motor-support T is hinged independently of the axle upon the part K and is capable of vibration upon the latter without interfering with the proper engagement of its gear-pinion with the main driving gear-wheel U'.

I have found great advantage to result from the connecting of the motor to the front axle in the manner described and at the same time having said axle to be used for steering.

It will be readily seen that numerous forms of vehicle can be constructed varying from each other in details, but each containing the essential features of my invention. I do not regard it necessary to describe or illustrate all of the well-known detail parts of such vehicles or carriages.

When the axle is mounted in a tube of the character of that at K, it can be more or less independent of the supports so far as endwise play is concerned, and the lateral or longitudinal thrust of this shaft can be taken upon balls arranged in any suitable way—as, for instance, those at J', interposed between the bracket or hanger at L and the gear-wheel U' or other suitable abutment. A steel sleeve $J^2$ is shown as being inserted into each bracket or hanger L, and between it and the shaft are interposed antifriction-rollers $J^3$. The sleeve $J^2$ can be utilized to receive or hold in place both the radially-acting rollers $J^3$ and the longitudinally-acting balls J'. The tube K serves to not only space properly the brackets or hangers L, but also to hold them in proper line and to give them a rigid connection, it and the brackets together constituting a frame entirely independent of the shaft and, moreover, serve to keep the bearings of the axle closed and dust-proof.

The gearing at U U' may be of any preferred sort, either a simple direct single-reduction pinion and wheel or a compensating gear of the "jack-in-the-box" type or other form, or, again, gearing of a simple character or the compensating sort can be employed in connection with a counter-shaft.

A brake can be readily applied. A brake-support is shown at V, it consisting of an arm $v$, having an eye $v'$ for hinging it upon the sleeve $T^2$. It also carries an arm $v^2$, which extends upwardly and at the upper end supports the pivot-shaft $v^5$ for a brake-shoe or friction-band, which can be used to engage with a flange $v^3$, formed or secured on the gear-wheel, within the planes of the periphery thereof. The arms $v$ $v^2$ $v^4$ can be joined by a strengthening-web $v^5$, and they are shown as being formed integral with the cap $t^3$, which is secured to the bearing for one end of the armature-shaft.

Instead of arranging the brake in the manner just described to operate upon the gear-wheel U' it may be arranged to work upon the rear traction-wheels G.

As shown in Fig. 1, a rock-shaft W is mounted on the rear axle G' and is provided with an upwardly-extending arm W'. This shaft is connected to band-brakes which encircle disks carried by the wheel-hubs. To apply the brakes, chain or cable W is provided, one end of which is connected to the free end of the aforesaid arm W' and the other end extends forwardly and is connected with suitable controlling means accessible to the motorman.

As hereinbefore described, the motor S is connected with the body at points in rear of the arms $t$ by a spring-support. In the embodiment of my invention herein illustrated this support consists of a rod Y', whose upper end is securely fastened to a plate or bar Y, extending rearwardly from the frame N. This rod Y' extends through a passage in a lug $s$, formed on the motor-casing, and upon such rod, on opposite sides of said lug or ear $s$, are arranged coiled springs $y$. Nuts $y'$ $y^2$ hold the springs $y$ in position on the rod Y' and serve as means for varying and regulating the tension of said springs. The motor S is also connected to the sleeve $t$ of its support by a yielding or spring connection.

$s'$ designates a lug or ear extending forwardly from the motor-casing, and this lug is provided with an aperture through which a stud on the sleeve $t$ extends, coiled springs being arranged around said stud above and below the lug S'.

What I claim is—

1. In a vehicle, the combination with the body and the rear running-gear of the front running-gear pivotally connected to the vehicle whereby it can be used for steering, the electric motor below the vehicle-body, and movable vertically relatively to the running-gear, and power-transmitting devices for connecting the motor to the front wheels, substantially as set forth.

2. In a vehicle, the combination with the body and the rear running-gear, of the front running-gear having one or more steering-wheels, the electric motor beneath the body, and adapted to yield-vertically relatively to the running-gear and power devices connecting the motor with the said steering-wheel, substantially as set forth.

3. In a vehicle, the combination of the body, the rear running-gear, the front running-gear having one or more horizontally-adjustable wheels for steering, and the motor suspended below the body and adapted to rise and fall independently of the said steering-wheels, and connected thereto for driving them, substantially as set forth.

4. In a vehicle, the combination of the body, the rear running-gear, the front running-gear having one or more steering-wheels, the motor supported upon the front running-gear and hinged to permit it to vertically rise and fall and connected to the said steering-wheel to drive it and movable therewith in its steering movements, substantially as set forth.

5. In a vehicle, the combination with the body and the rear running-gear, of a front steering and propelling wheel, an electric motor adapted to move vertically with the body and to also move with the steering-wheel independently of the body, substantially as set forth.

6. In a vehicle, the combination of the body and the rear running-gear, of the front steering and propelling wheel, the motor supported upon springs and connected to the said steering and propelling wheel and movable therewith during its steering movements independently of the body, substantially as set forth.

7. In a vehicle, the combination with the body and the rear running-gear, of the front steering and propelling wheel, the steering devices for moving the said wheel independently of the body, a spring interposed between said wheel and the body the electric motor connected to the body at points above said spring, and power-transmitting devices between the said motor and the said steering-wheel and adapted to move with said wheel independently of the body, substantially as set forth.

8. In a vehicle, the combination of the body and the rear running-gear, of the front steering and propelling wheel, the axle or spindle therefor, the electric motor pivotally suspended independently of the axle and connected to the steering and propelling wheel and movable therewith independently of the body, substantially as set forth.

9. In a vehicle, the combination with the body and the running-gear of the steering and propelling wheel, the devices for positively steering the said wheel, the motor adapted to rise and fall independently of the body and of the said steering-wheel, and power devices connecting the motor to the steering-wheel, substantially as set forth.

10. In a vehicle, the combination with the body and a running-gear, of a supplemental running-gear having one or more wheels for steering, and an electric motor partly suspended from the axle of the supplemental running-gear, and partly suspended from the body and connected to the said steering-wheel and movable therewith independently of the body, substantially as set forth.

11. In a vehicle, the combination with the body, of a rear pair of wheels, a front pair of wheels, one of said pairs of wheels having an axle, a bearing for each end of the axle inside of its wheels respectively, an electric motor adapted to be connected to one or both of the said wheels, and a support for the motor carried by the said axle-bearings, independently of the axle, substantially as set forth.

12. In a vehicle, the combination with the body, of a front pair of wheels, a rear pair of wheels, a motor for driving one or both the wheels of one or both of said pairs, an axle for the last said wheels, bearings suspended from the body and situated inside of the wheels for supporting the said axle, and a motor-support secured to both of said bearings and pivotally connected to the motor, substantially as described.

13. In a vehicle, the combination of the body, the running-gear comprising two pairs of wheels, a motor for driving one or both the wheels of one of said pairs, an axle adapted to rotate with the driving wheel or wheels, supports for the axle situated respectively inside of the wheels, a driving-gear between one of said wheels and its adjacent axle-support, a motor carried by the axle-support independently of the axle, and supplemental means for connecting the motor to the body, substantially as set forth.

14. In a vehicle, the combination with the body and a running-gear having two pairs of wheels, of an electric motor connected to one or both wheels of one of said pairs, an axle adapted to be connected to one or both of said wheels and rotating around a vertical axis independently of the body, a driving-gear connected to the axle, a bearing for the axle extending downward from the body and situated inside of the gear-wheel, and means independent of the axles for supporting the motor, substantially as set forth.

15. In a vehicle, the combination with the body, of a driven traction-wheel, an axle therefor rotating around a vertical axis independently of the body, a driving-gear on the axle inside the traction-wheel, a bearing for the axle inside of the gear-wheel, and an electric motor adapted to swing or vibrate around the axis of the axle, and supported independently of the axle, substantially as set forth.

16. In a vehicle, the combination with the body, of a traction-wheel, a rotary axle for said wheel, a gear-wheel for rotating the axle, a motor adapted to vibrate independently of the axle, and connected to said gear-wheel, and means for connecting the traction-wheel with the motor or disconnecting it therefrom, substantially as set forth.

17. In a vehicle, the combination with the body, of a traction-wheel rotating around a vertical axis independently of the body, an axle for said wheel, a gear-wheel on the axle, a motor adapted to move vertically relatively to the said traction-wheel and vertically to the body, and means for connecting said traction-wheel with the motor and disconnecting it therefrom, substantially as set forth.

18. In a vehicle, the combination with the body, and the traction-wheel rotating around a vertical axis independently of the body, of an axle for the said wheel, a gear-wheel on the axle, and a bearing for the gear-wheel inside thereof, means independent of the bearing for pivotally supporting the motor independently of the body, and means for connecting the traction-wheel to the motor and disconnecting it therefrom substantially as set forth.

19. In a vehicle, the combination with the body, of a traction-wheel, an axle rotating around a vertical axis independently of the body, a gear-wheel on the axle, a motor movable vertically relatively to the body and connected to the gear-wheel, and means for connecting the gear-wheel to and disconnecting it from the traction-wheel, substantially as set forth.

20. In a vehicle, the combination with the body, of a traction-wheel, means for steering said wheel independently of the body, an axle for said wheel, an electric motor pivotally supported to move around the axis of the axle, and means for connecting said motor to and disconnecting it from the traction-wheel, substantially as set forth.

21. In a vehicle, the combination with the axle and the wheels thereon, of the tube around the axle, the motor supported upon the said tube independently of the axle, and the gearing interposed between the motor and one or more of said wheels, substantially as set forth.

22. In a vehicle, the combination with the rotating axle and the wheels of the bearings for the axle, the motor-support carried by one or more of said bearings, the motor secured to said support independently of the axle, the driving-gear for the axle, and means for connecting the motor to said driving-gear, substantially as set forth.

23. In a vehicle, the combination with the rotating axle, the bearings therefor, the motor-support rigidly connected to both of said bearings, the driving-gear for the axle, the motor carried by said support independently of the axle, and means connecting the motor to said gearing, substantially as set forth.

24. In a vehicle, the combination with the axle, the bearings for the axle, the gearing for driving the axle, and the springs supporting said bearings, of the connecting device rigidly connecting the said bearings independently of the axle, substantially as set forth.

25. In a vehicle, the combination of the rotary axle, the bearings therefor, the gearing connected thereto, the bracing and spacing device connecting the bearings, the motor supported upon said bracing and spacing device, the springs supporting the bearings, and means connecting the motor with the gearing, substantially as set forth.

26. In a vehicle, the combination with the rotary axle, the bearings therefor, the springs which carry the bearing, the tube surrounding the axle and connected to the said bearings independently of the axle, the gearing connected to the axle, and the motor for driving the gearing, substantially as set forth.

27. In a vehicle, the combination of the axle, the bearings for the axle, the springs carrying the bearings, the bracing and spacing device independent of the axle and connecting the said bearings, the gearing connected to the axle, the motor, and means for moving the axle bodily horizontally for steering, substantially as set forth.

28. In a motor-vehicle, the combination of the body, the two front wheels, the axle connected to said wheels and adapted to rotate with both thereof, bearings wherein the axle rotates, the springs connected to the bearings, the spring-frame interposed between the springs and the body, the gearing connected to the axle, the electric motor for driving the gearing and suspended partly from the axle and partly from the said spring-frame, and means for moving the motor the axle and the spring-frame bodily horizontally.

29. In a vehicle, the combination of the axle-bearing, the bracing and spacing device between the axle-bearings, the axle in said bearings, the motor connected to the axle, and means for turning the motor and the axle bodily horizontally, substantially as set forth.

30. In a vehicle, the combination with the body, of the traction-wheels, an axle adapted to rotate around a vertical axis for steering, the bearings for the axle, the motor for driving said axle, the rollers or antifriction devices adapted to take the radial thrust of the axle upon the bearings, and the antifriction devices between the bearing and the axle to take the end thrust thereof, substantially as set forth.

31. In a vehicle, the combination with the body, of the rotating axle, the traction-wheels mounted loosely thereon, means for connecting the traction-wheels to the axle, the motor for rotating the axle, the bearings for the axle having rollers or antifriction devices for the radial thrust of the axle, and antifriction devices for the end thrust of the axle, and the bracing and spacing device between the bearings, substantially as set forth.

32. In a vehicle, the combination of the rear running-gear, the frame connected therewith, the front running-gear, the frame connected therewith, the electric motor mounted upon the front running-gear, and turning bodily therewith whereby it is adapted to apply power at all times on lines parallel to the path of said gear, and the pivot connecting the said two frames on a vertical line between the axes of the front axle and the rear axle, substantially as set forth.

33. In a vehicle, the combination of the body, the rear running-gear, the body-frame connected thereto, the front running-gear, a supplemental frame therefor, the electric motor mounted upon the front running-gear, and turning bodily therewith, whereby it is adapted to apply power at all times on lines parallel to the path of said gear and means for connecting the said front-running-gear frame with the body-frame on a vertical axis in rear of the front axle, substantially as set forth.

34. In a vehicle, the combination of the rear running-gear, the body-frame connected thereto, the front running-gear having an axle and traction-wheels, the springs extending upward from the axle, the frame connected to the said springs, the electric motor suspended and supported partly from said axle and partly from said frame and means for connecting the said frame to the body-frame on a vertical axis behind the front axle, substantially as set forth.

35. In a vehicle, the combination with the body, of a front axle adapted to swing bodily horizontally, the motor for driving the said front axle and connected thereto substantially as set forth, to apply power uniformly thereto in all positions, and means for providing a pivotal connection for the front axle to the body on a vertical axis in rear of the front axle, substantially as set forth.

36. In a vehicle, the combination with the body, of the front running-gear having a frame pivotally connected to the body on a vertical axis in rear of the front axle, the electric motor mounted upon said frame and adapted to bodily rotate horizontally with the front axle, and a pivoted ring concentric with said vertical axis and means engaging with said ring for positively moving the front axle bodily around the said vertical axis, substantially as set forth.

37. In a vehicle, the combination with a body, a rear running-gear, and a front running-gear, of a motor, a motor-support having a tubular member adapted to loosely surround one of the axles, means for carrying said tubular member independently of the said axle, a supplemental support for the motor connected to the body, and gearing connecting the motor with one of the traction-wheels, substantially as set forth.

38. In a vehicle, the combination of a frame, a rear running-gear and a front running-gear, a motor-support having a sleeve member adapted to surround and vibrate axially about one of the axles, means for holding said sleeve member independently of said axle, a motor mounted on said vibratable support, a supplemental yielding support connecting the motor with the frame, and gearing for transmitting power from the motor to one of the traction-wheels, substantially as set forth.

39. In a motor-vehicle, the combination of a driving-axle, traction-wheels on said axle, an electric motor, a support for the motor surrounding the axle and mounted independently thereof and adapted to allow the motor to vibrate vertically relative to the axle, means for yieldingly limiting such vibration of the motor, and gearing connecting the motor and axle, substantially as set forth.

40. In a motor-vehicle, the combination of a frame, a rear running-gear, a front running-gear, a motor, a support for the motor loosely surrounding one of the axles, and carried independently thereof whereby the motor can vibrate vertically, a spring interposed between the motor and the frame of the vehicle, and gearing connecting the motor and one of the traction-wheels, substantially as set forth.

41. In a motor-vehicle, the combination of a frame, a rear running-gear, a front running-gear, a motor-support having a sleeve adapted to surround one of the axles, means for holding said sleeve out of contact with the axle and two side members or arms, a motor having its armature journaled in said side arms and its body connected with said sleeve, and a supplemental support connecting the motor and the frame, substantially as set forth.

In testimony whereof I affix my signature in presence of two witnesses.

FRANCIS A. POCOCK.

Witnesses:
WM. FINDLAY BROWN,
IRA JEWELL WILLIAMS.